United States Patent
Chen

(10) Patent No.: US 11,017,065 B2
(45) Date of Patent: *May 25, 2021

(54) AUTHORITY REVOKING METHOD AND DEVICE

(71) Applicant: Advanced New Technologies Co., Ltd., Grand Cayman (KY)

(72) Inventor: Dong Chen, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,699

(22) Filed: Dec. 20, 2019

(65) Prior Publication Data

US 2020/0143018 A1    May 7, 2020

Related U.S. Application Data

(63) Continuation of application No. 16/240,604, filed on Jan. 4, 2019, which is a continuation of application No. PCT/CN2017/089963, filed on Jun. 26, 2017.

(30) Foreign Application Priority Data

Jul. 5, 2016  (CN) .......................... 201610523017.4

(51) Int. Cl.
*G06F 21/31*  (2013.01)
*G06F 16/00*  (2019.01)
(Continued)

(52) U.S. Cl.
CPC .............. *G06F 21/31* (2013.01); *G06F 16/00* (2019.01); *G06F 21/30* (2013.01);
(Continued)

(58) Field of Classification Search
CPC ...... G06F 21/31; G06F 16/00; G06F 21/6218; G06F 21/30; H04L 9/08; H04L 9/0891; H04L 63/0807
See application file for complete search history.

(56) References Cited

U.S. PATENT DOCUMENTS 5,937,159 A * 8/1999 Meyers ................... G06F 21/31
                                                    726/20
6,128,740 A * 10/2000 Curry ................. G06Q 20/3821
                                                    380/51
(Continued)

FOREIGN PATENT DOCUMENTS

CN        102822793        12/2012
CN        103678392         3/2014
(Continued)

OTHER PUBLICATIONS

Griffiths et al "An Authorization Mechanism for a Relational Database System," IBM Research Laboratory, ACM Transactions on Database Systems, vol. 1, No. 2, Sep. 1976, pp. 242-255 (Year: 1976).*

(Continued)

*Primary Examiner* — Luu T Pham
*Assistant Examiner* — James J Wilcox
(74) *Attorney, Agent, or Firm* — Fish & Richardson P.C.

(57) ABSTRACT

An authorizing party determines an authorization record set that needs to be revoked, where an authorization record included in the authorization record set corresponds to a token that is issued to an authorized party after the authorizing party grants access to the authorized party, and where each authorization record includes an authorization validation moment for a corresponding token. A time validity attribute of the authorization record set is configured. For a specific point-in-time, a value associated with the time validity attribute is set. A determination is performed as to (Continued)

whether the authorization record is revoked based on the authorization validation moment and the value associated with the time validity attribute.

9 Claims, 7 Drawing Sheets

(51) Int. Cl.
    *H04L 9/08*     (2006.01)
    *G06F 21/62*     (2013.01)
    *H04L 29/06*     (2006.01)
    *G06F 21/30*     (2013.01)

(52) U.S. Cl.
    CPC ............ *G06F 21/6218* (2013.01); *H04L 9/08* (2013.01); *H04L 63/068* (2013.01); *H04L 63/0807* (2013.01); *H04L 9/0891* (2013.01)

(56) References Cited

U.S. PATENT DOCUMENTS

| | | | |
|---|---|---|---|
| 7,337,315 B2* | 2/2008 | Micali | H04L 9/3255 713/157 |
| 7,529,928 B2* | 5/2009 | Micali | G06Q 20/02 713/158 |
| 8,572,730 B1* | 10/2013 | Sobel | H04L 9/3247 726/22 |
| 8,893,232 B2* | 11/2014 | Fein | G06F 21/10 726/3 |
| 9,282,099 B2* | 3/2016 | Adams | G06F 21/121 |
| 9,348,437 B2* | 5/2016 | Zampini | G06K 9/222 |
| 9,412,031 B2* | 8/2016 | Rodriguez-Serrano | G06K 9/6277 |
| 9,686,287 B2* | 6/2017 | Manton | G06F 21/335 |
| 9,734,308 B2* | 8/2017 | Adams | H04L 63/20 |
| 9,853,820 B2* | 12/2017 | Adam | G06F 21/6218 |
| 2001/0002485 A1* | 5/2001 | Bisbee | G07F 7/12 713/167 |
| 2002/0046337 A1* | 4/2002 | Micali | H04L 9/3236 713/158 |
| 2004/0015703 A1* | 1/2004 | Madison | H04L 63/0807 713/185 |
| 2004/0128504 A1* | 7/2004 | Kivinen | H04L 9/3268 713/158 |
| 2005/0114653 A1* | 5/2005 | Sudia | H04L 9/3263 713/158 |
| 2007/0276843 A1* | 11/2007 | Lillibridge | G06F 16/125 |
| 2008/0192939 A1* | 8/2008 | Lotspiech | H04L 9/0891 380/279 |
| 2009/0249478 A1 | 10/2009 | Rosener et al. | |
| 2011/0071986 A1 | 3/2011 | Schmidt et al. | |
| 2011/0213967 A1* | 9/2011 | Wnuk | H04L 9/3268 713/158 |
| 2011/0320809 A1* | 12/2011 | Amendola | H04L 9/3073 713/158 |
| 2012/0144459 A1* | 6/2012 | Nguyen | H04L 9/0891 726/5 |
| 2013/0080327 A1 | 3/2013 | Baldrick et al. | |
| 2013/0152171 A1 | 6/2013 | Kindler et al. | |
| 2013/0238897 A1* | 9/2013 | Mashatan | H04L 63/20 713/158 |
| 2013/0312087 A1* | 11/2013 | Latzina | G06F 21/31 726/19 |
| 2014/0230020 A1* | 8/2014 | Mogaki | H04L 9/3213 726/4 |
| 2014/0258729 A1* | 9/2014 | Maletsky | G06F 21/64 713/189 |
| 2015/0058931 A1* | 2/2015 | Miu | G06Q 20/4016 726/3 |
| 2015/0058950 A1* | 2/2015 | Miu | H04L 63/08 726/7 |
| 2015/0059003 A1* | 2/2015 | Bouse | H04L 63/102 726/28 |
| 2016/0028736 A1* | 1/2016 | Gehring | H04W 12/0802 726/4 |
| 2016/0028848 A1* | 1/2016 | Gehring | H04L 67/146 709/213 |
| 2016/0044130 A1* | 2/2016 | Packham | G06F 16/9574 709/213 |
| 2016/0098267 A1* | 4/2016 | Meissner | G06F 8/656 717/168 |
| 2016/0350747 A1* | 12/2016 | Pruthi | H04L 63/061 |
| 2016/0350748 A1* | 12/2016 | Pruthi | H04L 63/061 |
| 2017/0111351 A1* | 4/2017 | Grajek | H04L 63/0853 |
| 2017/0264611 A1* | 9/2017 | Alen | H04L 63/0884 |
| 2018/0102904 A1* | 4/2018 | Lin | H04L 9/3268 |
| 2018/0109390 A1* | 4/2018 | Spratte | H04L 9/30 |
| 2019/0156001 A1 | 5/2019 | Chen | |

FOREIGN PATENT DOCUMENTS

| | | |
|---|---|---|
| CN | 104350501 | 2/2015 |
| CN | 105072180 | 11/2015 |
| CN | 105553675 | 5/2016 |
| CN | 106878002 | 6/2017 |
| JP | 2012008927 | 1/2012 |
| JP | 2012098839 | 5/2012 |
| JP | 2012238036 | 12/2012 |
| JP | 2013106251 | 5/2013 |
| JP | 2013246655 | 12/2013 |
| JP | 2016091063 | 5/2016 |
| JP | 2016526201 | 9/2016 |
| TW | 201519676 | 5/2015 |
| WO | WO 2014179076 | 11/2014 |

OTHER PUBLICATIONS

Rabitti et al "A Model of Authorization for Next-Generation Database Systems," ACM Transactions on Database Systems, vol. 16, No. 1, Mar. 1991, pp. 88-131 (Year: 1991).*
Crosby et al., "BlockChain Technology: Beyond Bitcoin," Sutardja Center for Entrepreneurship & Technology Technical Report, Oct. 16, 2015, 35 pages.
European Extended Search Report in European Patent Application No. 17823527.1, dated Jun. 18, 2019, 11 pages.
ietf.org [Online], "RFC 7519—JSON Web Token (JWT)," May 2015, [retrieved on Jun. 5, 2019], retrieved from: URL<https://tools.ietf.org/html/rfc7519#section-7>, 31 pages.
International Preliminary Report on Patentability in International Application No. PCT/CN2017/089963, dated Jan. 8, 2019, 10 pages (with English Translation).
International Search Report by the International Searching Authority issued in International Application No. PCT/CN2017/089963 dated Sep. 18, 2017; 9 pages.
Nakamoto, "Bitcoin: A Peer-to-Peer Electronic Cash System," www.bitcoin.org, 2005, 9 pages.
Richer, rfc-editor.org [Online], "OAuth 2.0 Token Introspection," Oct. 2015, [retrieved on Jun. 5, 2019], retrieved from: URL<https://www.rfc-editor.org/rfc/pdfrfc/rfc7662.txt.pdf>, 17 pages.
Written Opinion in International Application No. PCT/CN2017/089963, dated Sep. 18, 2017, 9 pages (with English Translation).

* cited by examiner

AUTHORITY REVOKING METHOD AND DEVICE

CROSS-REFERENCE TO RELATED APPLICATIONS

This application is a continuation of U.S. application Ser. No. 16/240,604, filed on Jan. 4, 2019, which is a continuation of PCT Application No. PCT/CN2017/089963, filed on Jun. 26, 2017, which claims priority to Chinese Patent Application No. 201610523017.4, filed on Jul. 5, 2016, and each application is hereby incorporated by reference in its entirety

TECHNICAL FIELD

The present application relates to the field of authority control technologies, and in particular, to an authority revoking method and device.

BACKGROUND

The development of computer and Internet technologies enables users to enjoy many convenient functions. However, as users' requirements getting higher, a single functional entity sometimes cannot satisfy users' various requirements. In this case, a plurality of relatively independent functional entities need to cooperate in a certain way to jointly provide services for the users. For example, to satisfy users' shopping requirement, a plurality of parties such as an e-commerce platform, a payment platform, and a logistics platform need to cooperate.

To implement cooperation between functional entities that are originally independent of each other, in addition to exchanging necessary data, the functional entities usually need to grant some necessary authority to each other. For example, a user needs to modify, by using application A, information that is stored by the user in a storage directory of website B (here, assumed that application A and website B are provided by different vendors). To satisfy this requirement, website B needs to grant personal information data modification authority to application A.

In terms of security, an authorizing party should further have a function of actively revoking granted authority. A general practice is as follows: The authorizing party writes each piece of authority granted to an authorized party as a record to a database, adds one attribute field used to indicate whether the authority is valid to each record, and actively revokes the authority by modifying a value of the field to "invalid". A problem of this solution is as follows: Each time revoking a piece of authority, a field update operation needs to be performed on the database. If authority needs to be revoked in batches, related authorization records need to be updated one by one. In the database operation environment, actual efficiency of such processing is relatively low. In addition, operation logic of "updating one by one" also needs to be compiled and implemented by high labor and time costs. If different authorization records are stored in different libraries or tables, corresponding data update operations further need to be related to library separation or table separation, further increasing technology implementation difficulty.

SUMMARY

For the previous technical problem, the present application provides the following technical solutions:

According to a first aspect of the present application, a database authorization record batch-revoking method is provided, where a time validity attribute is configured for an authorization record set needing revoking, the time validity attribute is used to describe a time point, so an authorization record whose authorization validation moment is earlier than the time point in the set becomes invalid, and the method includes: determining an authorization record set needing revoking; and setting a time validity attribute value for the determined set, and setting the time validity attribute value T0 to a current moment or a future moment.

According to a second aspect of the present application, a database authorization record batch-revoking method is provided, where a first time validity attribute or a second time validity attribute is configured for an authorization record set needing revoking, the first time validity attribute is used to describe a first time point, so an authorization record whose authorization validation moment is earlier than the first time point in the set becomes invalid; the second time validity attribute is used to describe a second time point, so an authorization record whose authorization validation moment is later than the second time point in the set becomes invalid, and the method includes: determining an authorization record set needing revoking; when the first time validity attribute is configured for the set, determining the latest validation moment of authorization records in the set and setting a first time validity attribute value for the set, so the first time validity attribute value T1>the latest validation moment of the authorization records in the set; when the second time validity attribute is configured for the set, determining the earliest validation moment of authorization records in the set, and setting a second time validity attribute value for the set, so the second time validity attribute value T2<the earliest validation moment of the authorization records in the set.

According to a third aspect of the present application, a database authorization record validity verification method is provided, where a first time validity attribute or a second time validity attribute is configured for an authorization record set needing revoking, the first time validity attribute is used to describe a first time point, so an authorization record whose authorization validation moment is earlier than the first time point in the set becomes invalid, the second time validity attribute is used to describe a second time point, so an authorization record whose authorization validation moment is later than the second time point in the set becomes invalid; and the method includes: determining an authorization record to be verified; obtaining a validation moment of the authorization record to be verified; obtaining a first time validity attribute value or a second time validity attribute value of an authorization record set that includes the authorization record to be verified; and determining that the authorization record to be verified is invalid, when the obtained validation moment is earlier than the obtained first time validity attribute value; or determining that the authorization record to be verified is invalid, when the obtained validation moment is later than the obtained second time validity attribute value.

According to a fourth aspect of the present application, a database authorization record batch-revoking device is provided, where a time validity attribute is configured for an authorization record set needing revoking, the time validity attribute is used to describe a time point, so an authorization record whose authorization validation moment is earlier than the time point in the set becomes invalid, and the device includes: a revoking task determining unit, configured to determine an authorization record set needing revoking; and a revoking execution unit, configured to set a time validity attribute value for the determined set, and set the time validity attribute value T0 to a current moment or a future moment.

According to a fifth aspect of the present application, a database authorization record batch-revoking device is provided, where a first time validity attribute or a second time validity attribute is configured for an authorization record set needing revoking, the first time validity attribute is used to describe a first time point, so an authorization record whose authorization validation moment is earlier than the first time point in the set becomes invalid, the second time validity attribute is used to describe a second time point, so an authorization record whose authorization validation moment is later than the second time point in the set becomes invalid, and the device includes: a revoking task determining unit, configured to determine an authorization record set needing revoking; and a revoking execution unit, configured to determine the latest validation moment of authorization records in the set and set a first time validity attribute value for the set when the first time validity attribute is configured for the set, so the first time validity attribute value T1>the latest validation moment of the authorization records in the set; or determine the earliest validation moment of authorization records in the set and set a second time validity attribute value for the set, when the second time validity attribute is configured for the set, so the second time validity attribute value T2<the earliest validation moment of the authorization records in the set.

According to a sixth aspect of the present application, a database authorization record validity verification device is provided, where a first time validity attribute or a second time validity attribute is configured for an authorization record set needing revoking, the first time validity attribute is used to describe a first time point, so an authorization record whose authorization validation moment is earlier than the first time point in the set becomes invalid, the second time validity attribute is used to describe a second time point, so an authorization record whose authorization validation moment is later than the second time point in the set becomes invalid, and the device includes: a verification object determining unit, configured to determine an authorization record to be verified; a first acquisition unit, configured to obtain a validation moment of the authorization record to be verified; a second acquisition unit, configured to obtain a first time validity attribute value or a second time validity attribute value of an authorization record set that includes the authorization record to be verified; and a verification unit, configured to determine that the authorization record to be verified is invalid, when the obtained validation moment is earlier than the obtained first time validity attribute value; or determine that the authorization record to be verified is invalid, when the obtained validation moment is later than the obtained second time validity attribute value.

According to a seventh aspect of the present application, an authorization token batch-revoking method for a third-party application is provided, and the method includes: determining a third-party application needing authorization token revoking; obtaining a current moment, and setting a time validity attribute value for the determined third-party application, so the time validity attribute value T0=current moment; receiving an authorization token provided by the third-party application; obtaining a validity attribute value of the authorization token; and further obtaining a validation moment of the authorization token and the time validity attribute value of the third-party application if the validity attribute value indicates valid, and determining that the authorization token is invalid if the obtained validation moment is earlier than the obtained time validity attribute value; otherwise, determining that the authorization token is valid.

According to the technical solutions provided in the present application, a time validity attribute is configured for an authority record set needing batch-revoking. As such, an authority record can be updated to an invalid state by modifying a value of the attribute, thereby revoking the authority record. This newly added attribute does not affect the meaning of an existing attribute. In addition, because the attribute is configured specifically for a set of records, states of all records in the set can be updated by performing one modification operation instead of updating authorization records in a database one by one, and different storage locations of a plurality of authorization records have no impact on the complexity of updating and/or revoking the records in a set. Therefore, authority batch-revoking processing efficiency is effectively improved, and technology implementation difficulty is reduced.

It should be understood that the previous general description and the following detailed description are merely an example for explanation, and do not limit the present application.

BRIEF DESCRIPTION OF DRAWINGS

To describe the technical solutions in the implementations of the present application or in the existing technology more clearly, the following briefly introduces the accompanying drawings needed for describing the implementations or the existing technology. Apparently, the accompanying drawings in the following description merely show some implementations recorded in the present application, and a person of ordinary skill in the art can still derive other drawings from these accompanying drawings without creative efforts.

DESCRIPTION OF IMPLEMENTATIONS

Figure 1:
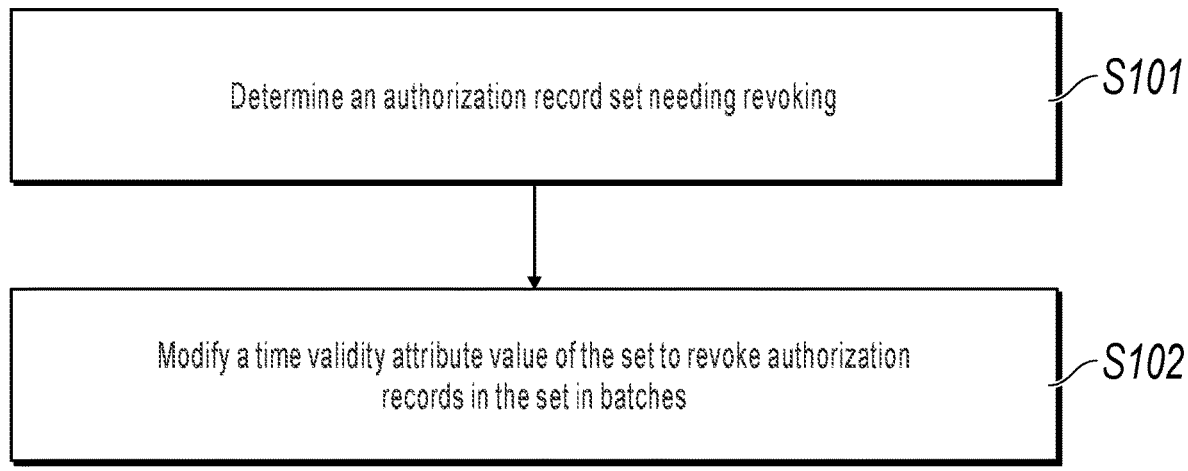
FIG. 1 is a schematic flowchart illustrating an authority revoking method, according to the present application.

To make a person skilled in the art better understand the technical solutions in the present application, the following describes the technical solutions in the implementations of the present application in detail with reference to the accompanying drawings in the implementations of the present application. Apparently, the described implementations are merely some rather than all of the implementations of the present application. All other implementations obtained by a person of ordinary skill in the art based on the implementations of the present application shall fall within the protection scope of the present application.

For an authorizing party, each piece of authority that has been granted to an authorized party is stored in a database in the form of a data record. Table 1 shows an example of a data structure of an authority record. It is worthwhile to note that a field attribute shown in the table is merely used for illustrative description, and constitutes no limitation on the solution.

TABLE 1

| Authority ID | Authority type | Authorized party | User ID | Validation moment | Validity |
|---|---|---|---|---|---|
| 100001 | Read | Application 1 | User 001 | 2016 Jun. 01 | Valid |
| 100002 | Write | Application 2 | User 002 | 2016 Jun. 10 | Valid |
| 100003 | Write | Application 1 | User 002 | 2016 Jun. 10 | Valid |
| ... | ... | ... | ... | ... | ... |

According to an authority management method in the existing technology, the authorizing party controls whether authority is valid by using an attribute field "validity" in each authority record. When authority needs to be revoked in batches, assume that n authority records need to be revoked, attribute fields "validity" corresponding to the authority records need to be modified one by one. Theoretical algorithm complexity in completing all revoking processing is O(n). Actual processing difficulty is further improved if the n records are stored in different libraries or tables.

For the previous problem, a solution provided in the present application is as follows: Authority records that need to be revoked in batches are considered as one set, and an attribute used for overall validity control is configured for the set, so authority can be revoked in batches through one-time modification.

Based on actual demands, authorization records that need to be revoked in batches generally has certain "generality", and the "generality" indicates that a plurality of authority records have one or more same attribute values. For example, "the authorization records that need to be revoked in batches belong to application 1", or "the authorization records that need to be revoked in batches belong to user 001".

After a set whose authority needs to be revoked in batches is determined, a new attribute is configured for the set, and the attribute is used to collectively indicate validity of all authority records in the set. To avoid a meaning conflict between the newly added attribute and an existing attribute "validity" in a single record, the newly added attribute is described by adding a time dimension in the present application. A newly added attribute of a certain given set can indicate the earliest authorization validation moment allowed to validate an authorization record set. Based on actual demands, a data type of the newly added attribute can be "date", "time", or time data types. Regardless of the data type, a value of the newly added attribute is considered as a specific time point corresponding to the value.

To be specific, the value of the attribute describes a time point $T_0$. When authority validity verification is performed subsequently, if a validation moment of a certain authority record in the set is earlier than the time point, the authority record is considered to be invalid. In this case, an attribute value of "validity" of the record no longer works. Otherwise, if a validation moment of a certain authority record in the set is equal to or later than the time point, validity of the record can be further determined based on an attribute value of "validity" of the record. As such, one-time invalidation processing can be performed on states of all records in the set by modifying the attribute value of the newly added attribute.

Table 1 is used as an example. Assume that the three current valid authority records shown in Table 1 form a set (actual meanings corresponding to the set are temporarily not considered here, and the set is used for illustrative description purpose only), if "the earliest authorization validation moment" of the set is assigned to "2016/06/12", validation moments of the three authority records in Table 1 are earlier than the moment. Therefore, all the three authority records are considered to be invalid, and the three authorization records are revoked in batches through one-time data modification.

In conclusion, as shown in FIG. 1, an authority batch-revoking method provided in the present application can include the following steps:

S101. Determine an authorization record set needing revoking.

"Set" here is described based on actual demands. For example, if authority needs to be revoked in batches based on an "authorized party" category, authority records for different authorized parties can be described as different sets; or if authority needs to be revoked in batches based on a "user" category, authority records for different users can be described as different sets. Certainly, "set" can also be jointly described by using a plurality of attribute dimensions. Examples are omitted here for simplicity.

S102. Set a time validity attribute value for the determined set, to revoke authorization records in the set in batches.

For ease of description, "time validity attribute" is used to represent the previous "earliest authorization validation moment" below. It is worthwhile to note that "time validity attribute" is specific to the set, and should not be confused with an attribute such as "validation moment" or "invalidation moment" specific to a single record.

It can be seen from the previous definition of "time validity attribute" that theoretically, the authorization records in the set can be revoked in batches provided that a modified time validity attribute value satisfies the following condition: $T_0$>the latest validation moment of the authorization records in the set.

It is worthwhile to note that, mathematical expressions ">" and "<" of data such as date or time can be respectively explained as "later" and "earlier". Table 1 is used as an example. In the three authorization records, the latest validation moment is 2016/06/10. Therefore, authority can be revoked in batches provided that the value of $T_0$ is later than 2016/06/10, for example, $T_0$=2016/06/11, $T_0$=2016/06/12, or $T_0$=2016/06/13.

According to an implementation of the present application, when a batch-revoking operation needs to be performed, the latest validation moment of the authorization records in the set can be first determined, and then $T_0$ can be set to any value provided that "$T_0$>the latest validation moment of the authorization records in the set".

In practice, $T_0$ can be directly set to a current moment or a future moment to avoid the step of "determining the latest validation moment of the authorization records in the set".

If authority corresponding to the set is only revoked temporarily, and can still be re-granted subsequently, the value range of $T_0$ can be further limited: Assume that the next earliest authorization validation moment of each record in the set can be predetermined, the time validity attribute value $T_0$ needs to further satisfy the following condition: $T_0$<the next earliest authorization validation moment. Table 1 is still used as an example. Assume that it is known that authority starts to be re-granted on 2016/06/20 after authority is revoked in batches this time, $T_0$ needs to be earlier than 2016/06/20 to ensure that authorization after 2016/06/20 is not affected by the time validity attribute value.

According to an implementation of the present application, when a batch-revoking operation needs to be performed, obtain a current moment and directly set $T_0$=current moment. Because "current moment" satisfies both "$T_0$<the next earliest authorization validation moment" and "$T_0$>the latest validation moment of the authorization records in the set", the value of $T_0$ can not only ensure that authority in the set can be revoked in batches, but also have no impact on subsequent reauthorization.

It can be understood that, to implement a moment comparison, the time of the attribute value can be more precise based on actual demands, for example, precise to an hour/a minute/a second. Further details are omitted here.

Figure 2:
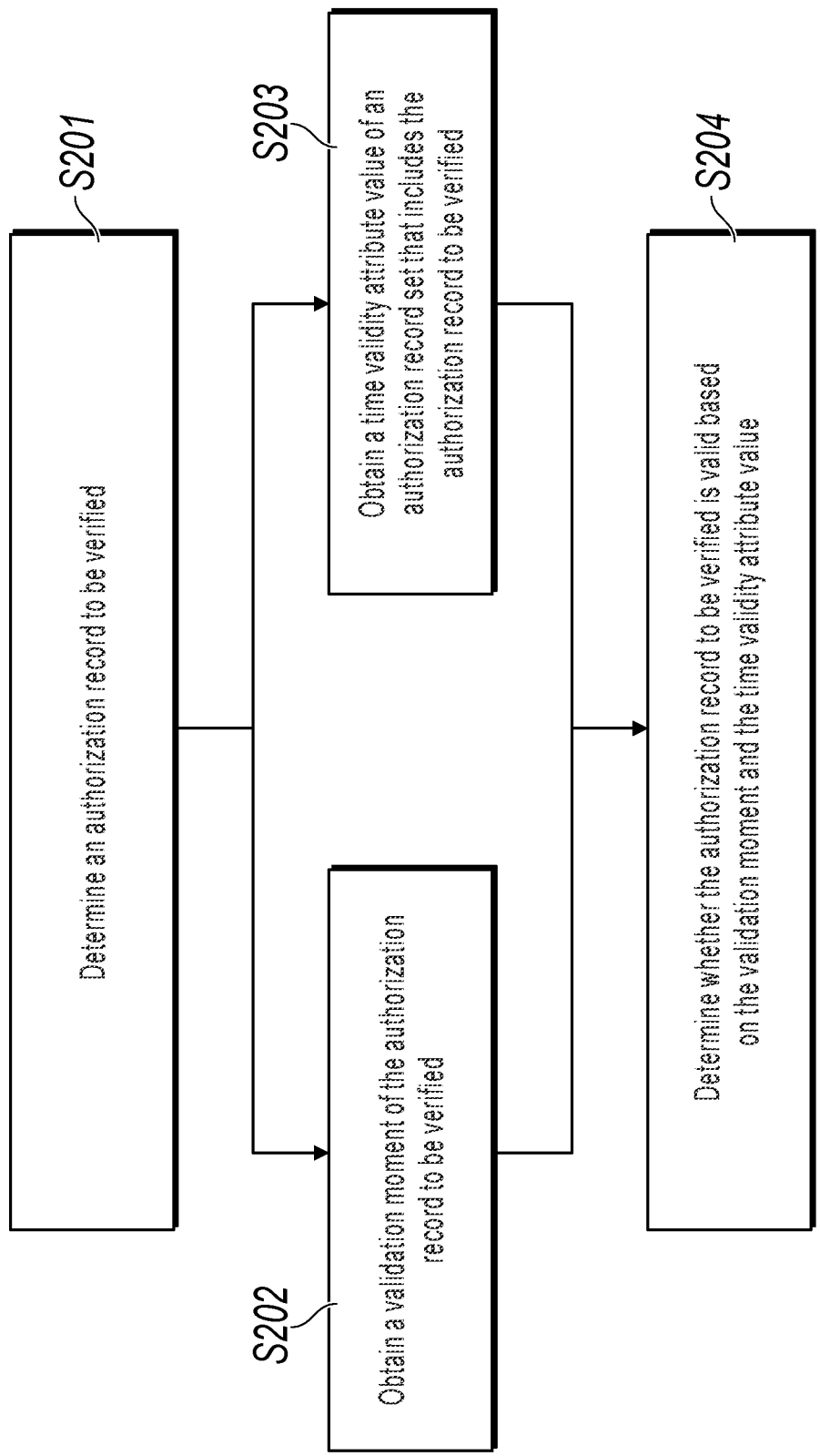
FIG. 2 is a schematic flowchart illustrating an authority verification method, according to the present application.

Corresponding to the previous authority batch-revoking method, the present application further provides a database authorization record validity verification method. As shown in FIG. 2, the method can include the following steps:

S201. Determine an authorization record to be verified.

S202. Obtain a validation moment of the authorization record to be verified.

S203. Obtain a time validity attribute value of an authorization record set that includes the authorization record to be verified.

S204. Determine that the authorization record to be verified is invalid, when the obtained validation moment is earlier than the obtained time validity attribute value.

According to the solution of the present application, an authorizing party can determine, based on authority verification information provided by a to-be-verified party, an authorization record corresponding to the verification information and a set that includes the authorization record, and then further obtain related data for comparison to verify authority validity. In comparison with the existing technology, in the present application, to verify the validity of an authorization record, a set that includes the authorization record needs to be identified and then whether the authorization record is valid is determined based on "time validity attribute" of the set. Two cases can be involved here:

(1) Only "time validity attribute" added in the present application is used to verify whether the authorization record is valid:

In this case, an attribute "validity" specific to a single authorization record in the existing technology is no longer considered. If a validation moment of a single record is earlier than a time validity attribute value of the set, the authorization record is determined to be invalid; otherwise, if a validation moment of a single record is later than or equal to a time validity attribute value of the set, the authorization record is determined to be valid.

(2) "Validity" specific to a single authorization record and "time validity attribute" are jointly used to verify whether the authorization record is valid:

In this case, the authorization record is determined to be valid only when two conditions "a state of a single record is valid" and "a validation moment of a single record is later than or equal to a time validity attribute value of a set" are simultaneously satisfied. Otherwise, the authorization record is considered to be invalid. In practice, a sequence of determining the two conditions does not need to be limited.

In the previous implementation, "time validity attribute" is used to describe a time point, so an authorization record whose authorization validation moment is earlier than the time point in the set becomes invalid. Based on a similar idea, "time validity attribute" can have another definition. For example, in an implementation of the present application, "time validity attribute" can be described as the latest authorization validation moment allowed to validate the authorization record set.

To be specific, the value of the attribute describes a time point $T_0$. When authority validity verification is subsequently performed, an authorization record in the set is considered to be invalid if a validation moment of the authority record is later than the time point.

Correspondingly, when a batch-revoking operation needs to be performed, a processing method changes (relative to S102) to the following method: The earliest validation moment of authorization records in the set is first determined, and then $T_0$ can be set to any value provided that "$T_0$>the earliest validation moment of authorization records in the set".

Further, when record validity needs to be verified, determining logic changes (relative to S204) to the following: The authorization record to be verified is determined to be invalid when the obtained validation moment is later than the obtained time validity attribute value.

In this implementation, although the definition of the time validity attribute is changed, overall processing logic is basically similar to that of the previous implementation. Therefore, this implementation only focuses on differences, and the other parts are omitted for simplicity.

In addition, it is worthwhile to note that "validation moment" described in the solution of the present application is a time point at which certain authority is generated or starts to function, and should not be construed as a field "validation moment" in a database in a narrow sense. For example, in different databases, an attribute field name used to indicate the previous time point can be "authority validation moment/time/date", "authority creation moment/time/date", "authorization moment/time/date", etc. It does not affect implementation of the solutions of the present application.

In addition, in some cases, a plurality of different fields in a database can have similar functions. For example, there are two attribute fields: "authority creation moment" and "authority validation moment" in some databases. The latter can be slightly delayed than the former. However, based on actual demands, both "creation" and "validation" are usually completed when authority needs to be performed in batches. In this case, when the solution of the present application is applied, using the two attribute fields as "validation moment" in the previous solution can achieve the same authority batch-revoking effects and authority validity verification effects. These cases should also fall within the protection scope of the present application.

The following describes the technical solutions provided in the present application with reference to a specific application example.

The Open Authorization (OAUTH) protocol provides a secure, open and simple standard for authorization of user resources. For an authorizing party, authority is granted to an authorized party by using OAUTH, so the authorized party can visit user resources of the authorizing party without visiting user account information (such as a user name and a password).

Figure 3:
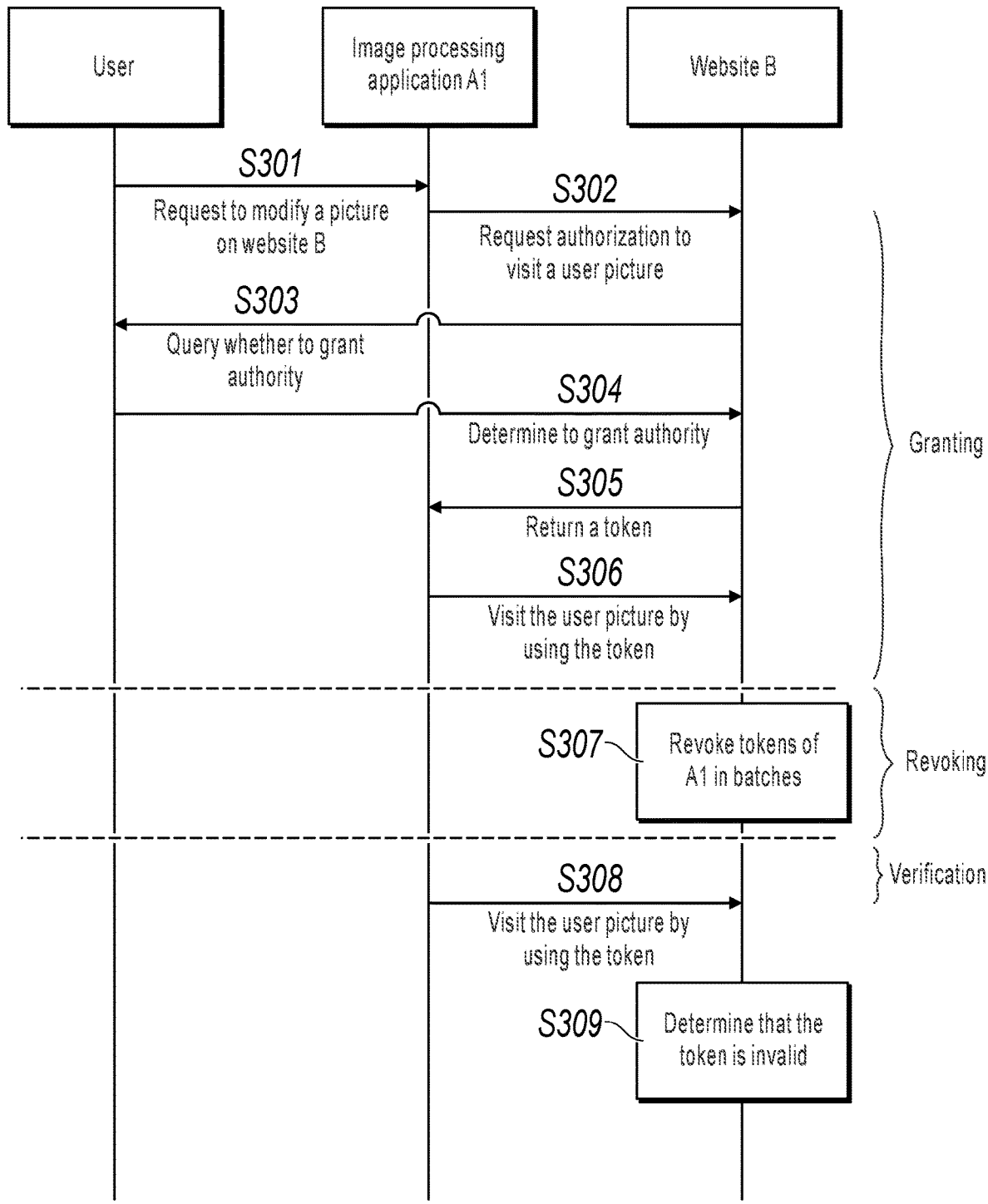
FIG. 3 is a combined schematic flowchart illustrating an authority granting, revoking, and verification method, according to the present application.

Assume that a current scenario is that a user modifies, by using a certain image processing application A1, a picture stored by the user on website B. To satisfy the previous requirement, website B needs to grant picture data modification authority to the image processing application A1. An authorization process is shown in FIG. 3 according to the OAUTH protocol.

S301. A user requests to modify, by using application A1, a picture stored by the user on website B.

S302. Application A1 requests website B to authorize application A1 to visit the picture of the user.

S303. Website B queries the user whether to authorize application A1 to visit the picture.

S304. The user determines authorization.

S305. Website B returns a token to application A1.

S306. Application A1 visits the picture of the user by using the token.

One token corresponds to one authority record granted by an authorizing party to an authorized party. For the authorizing party, token data is stored in a database, and a key attribute of one piece of token data can include the following:

Token identifier: used to uniquely distinguish between tokens.

Authorized party identifier: indicates an authorized party that is issued with a token, for example, "image processing application A1".

User identifier: indicates a user who has a token, for example, "Zhang San".

Token validation moment: A value is a specific time point, for example, 2016/06/01 and 2016/06/01-13:00:00.

Token invalidation moment: A value is a specific time point, for example, 2017/06/01 and 2017/06/01-13:00:00.

Current token validity: A value indicates valid or invalid.

In actual practice, a large number of users modify their pictures on website B by using application A1. Therefore, website B needs separately issue tokens specific to the users to application A1. As shown in Table 2, issued tokens are recorded in a token data table:

TABLE 2

| Token identifier | Authorized party | User | Validation moment | Invalidation moment | Validity |
|---|---|---|---|---|---|
| 100001 | Application A1 | Zhang San | 2016 Jun. 01 | 2017 Jun. 01 | Valid |
| 100002 | Application A1 | Li Si | 2016 Jun. 10 | 2017 Jun. 10 | Valid |
| 100003 | Application A1 | Wang Wu | 2016 Jun. 12 | 2017 Jun. 12 | Valid |
| 100004 | Application A2 | Zhao Liu | 2016 Jun. 02 | 2017 Jun. 30 | Valid |
| 100005 | Application A3 | Xiaoming | 2016 Jun. 05 | 2017 Jul. 05 | Valid |
| ... | ... | ... | ... | ... | ... |

Assume that website B wants to revoke, based on "authorized party"-category, tokens in batches that have been issued to a certain authorized application or some authorized applications, according to the solution of the present application, different token sets can be divided based on different authorized parties, and a corresponding attribute "earliest authorization validation moment" can be configured for each token set.

A specific implementation is as follows: As shown in Table 3, an attribute "earliest authorization validation moment" is added to an authorized application attribute table (the table can be created if not exist):

TABLE 3

| Authorized party | Earliest authorization validation moment |
|---|---|
| Application A1 | |
| Application A2 | |
| Application A3 | |
| ... | ... |

Assume that for a purpose of security, website B needs to revoke all tokens in batches authorized to application A1, according to the solution of the present application, as shown in S307 in FIG. 3, website B can directly modify an attribute value of "earliest authorization validation moment" corresponding to "application A1" in the authorized application attribute table. A method in which the attribute value is directly modified to a current moment is used here. Assume that the current moment is 2017/06/15, a result obtained after the attribute value is written is shown in Table 4:

TABLE 4

| Authorized party | Earliest authorization validation moment |
|---|---|
| Application A1 | 2017 Jun. 15 |
| Application A2 | |
| Application A3 | |
| ... | ... |

As such, a batch-revoking operation on the tokens of application A1 is completed. The operation affects the first three data records (the authorized party is application A1) in Table 2 without modifying attributes "validity" of the three records one by one.

As shown in S308 and S309 in FIG. 3, when application A1 re-visits website B subsequently by using the token, website B obtains a validation moment of the token by querying a token attribute table, and obtains the earliest authorization validation moment of A1 by querying the authorized application attribute table. "Validation moments" of the first three token records shown in Table 2 are all earlier than "earliest authorization validation moment" of application A1. Therefore, all the three tokens are actually considered to be invalid.

In addition, if A1 needs to be reauthorized subsequently, an authorization validation moment of A1 is later than the currently recorded "earliest authorization validation moment" (here, assume that token revoking and token reissuing do not occur on the same day, and data precision of related attribute values can be adaptively adjusted if on the same day). Therefore, validity of a token subsequently reissued to application A1 is not affected by "earliest authorization validation moment".

In practice, comprehensive determination can be performed by combining "validity" of the token and "earliest authorization validation moment" of the token set. The token is determined to be valid only when two conditions "a state of the token is valid" and "a validation moment of the token is later than or equal to the earliest authorization validation moment of the token set" are both satisfied. If any of the two conditions cannot be satisfied, the token is considered to be invalid. Certainly, a sequence of determining the previous two conditions does not need to be limited.

It can be seen that in comparison with the existing technology, in the solution of the present application, for n authority records that need to be revoked in batches, theoretical algorithm complexity corresponding to revoking processing can be reduced from O(n) to O(1). In addition, because authority batch-revoking can be implemented by performing one-time data modification on the database in the solution of the present application, a plurality of complex cases in which authority records are stored in separate libraries or separate tables do not need to be considered, effectively reducing actual technology implementation difficulty of the solution.

Figure 4:
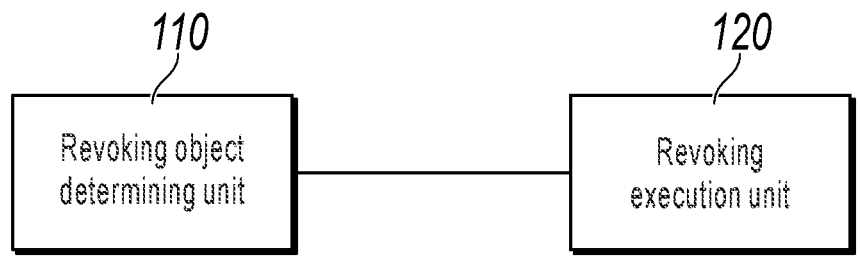
FIG. 4 is a schematic structural diagram illustrating an authority revoking device, according to the present application.

Corresponding to the previous method implementation, the present application further provides a database authorization record batch-revoking device. As shown in FIG. 4, the device can include: a revoking object determining unit 110, configured to determine an authorization record set needing revoking; and a revoking execution unit 120, configured to set a time validity attribute value for the determined set, and set the time validity attribute value T0 to a current moment or a future moment.

In a specific implementation of the present application, the authorization record set can include authorization records for the same authorized party.

In a specific implementation of the present application, when the next earliest authorization validation moment of the authorization record set needing revoking can be determined, the revoking execution unit 120 can be configured to set the time validity attribute value for the determined set, so the modified attribute value T0 further satisfies the following condition: the latest validation moment of authorization records in the set<T0<the next earliest authorization validation moment.

In a specific implementation of the present application, the revoking execution unit 120 can be configured to obtain the current moment, and set the time validity attribute value for the determined set, so the modified attribute value T0=current moment.

In another specific implementation of the present application, the revoking execution unit 120 can be alternatively configured to: determine the latest validation moment of authorization records in the set, and set a first time validity attribute value for the set when a first time validity attribute is configured for the set, so the first time validity attribute value T1>the latest validation moment of the authorization records in the set; or when a second time validity attribute is configured for the set, determine the earliest validation moment of authorization records in the set, and set a second time validity attribute value for the set, so the second time validity attribute value T2<the earliest validation moment of the authorization records in the set.

The first time validity attribute is used to describe a first time point, so an authorization record whose authorization validation moment is earlier than the first time point in the set becomes invalid, and the second time validity attribute is used to describe a second time point, so an authorization record whose authorization validation moment is later than the second time point in the set becomes invalid.

Figure 5:
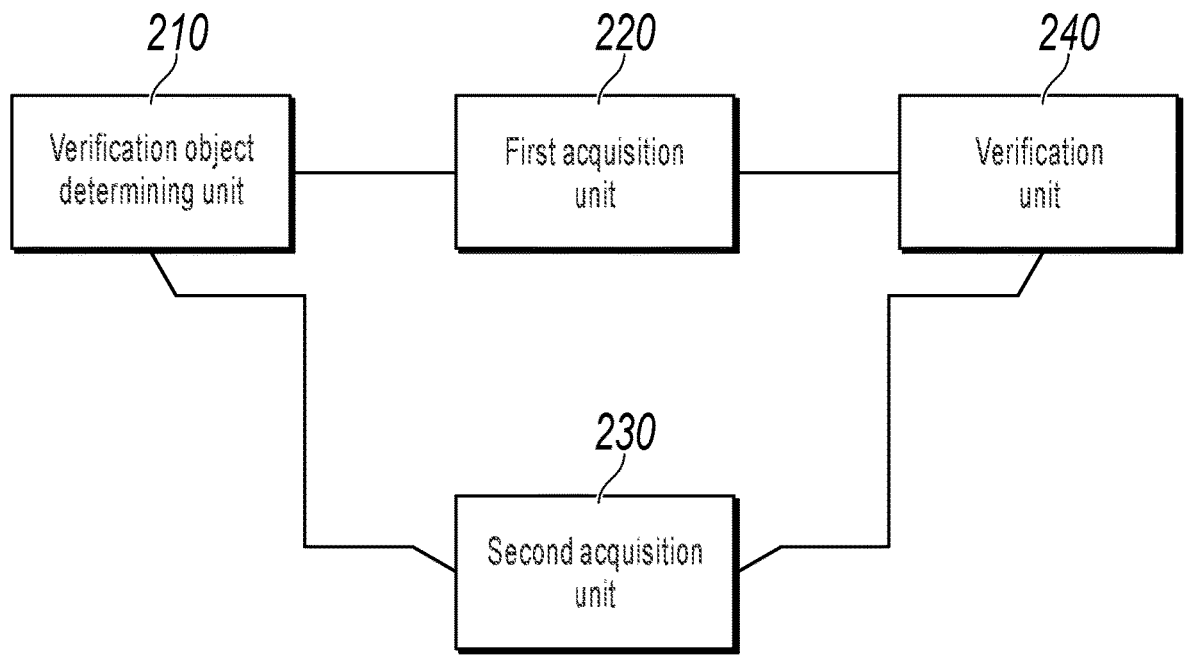
FIG. 5 is a first schematic structural diagram illustrating an authority verification device, according to the present application.

The present application further provides a database authorization record validity verification device. As shown in FIG. 5, the device can include: a verification object determining unit 210, configured to determine an authorization record to be verified; a first acquisition unit 220, configured to obtain a validation moment of the authorization record to be verified; a second acquisition unit 230, configured to obtain a first time validity attribute value or a second time validity attribute value of an authorization record set that includes the authorization record to be verified; and a verification unit 240, configured to determine that the authorization record to be verified is invalid, when the obtained validation moment is earlier than the obtained first time validity attribute value; or determine that the authorization record to be verified is invalid, when the obtained validation moment is later than the obtained second time validity attribute value.

Figure 6:
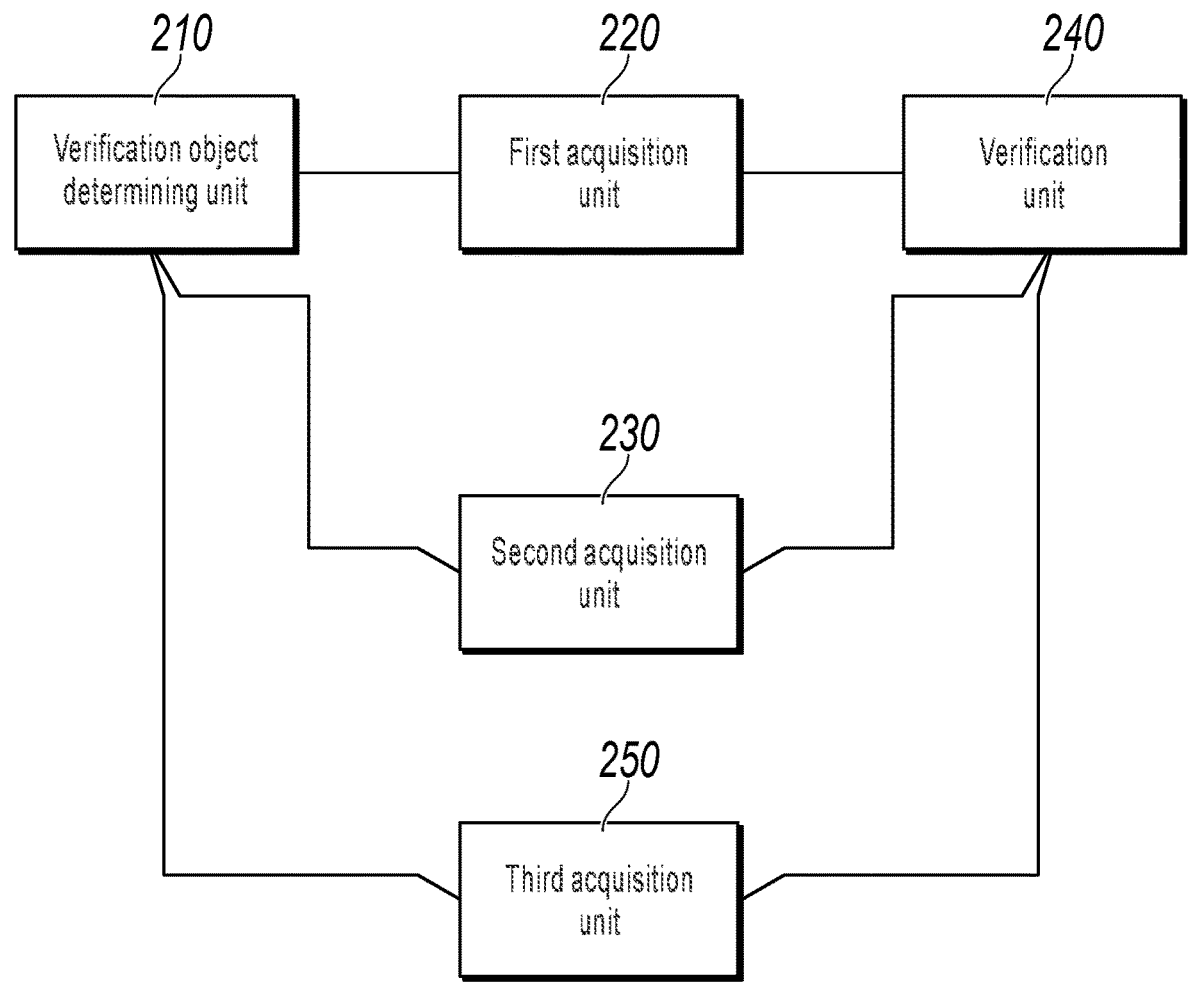
FIG. 6 is a second schematic structural diagram illustrating an authority verification device, according to the present application.

As shown in FIG. 6, in a specific implementation of the present application, the previous database authorization record validity verification device can further include a third acquisition unit 250, configured to obtain a validity attribute value of the authorization record to be verified.

Correspondingly, the verification unit 240 can be further configured to determine that the authorization record to be verified is valid, when the obtained validity attribute value indicates valid and the obtained validation moment is not earlier than the obtained first time validity attribute value; or determine that the authorization record to be verified is invalid, when the obtained validity attribute value indicates valid and the obtained validation moment is not later than the obtained second time validity attribute value.

It can be seen from the descriptions of the implementations that a person skilled in the art can clearly understand that the present application can be implemented by using software and a necessary general hardware platform. Based on such an understanding, the technical solutions in the present application essentially or the part contributing to the existing technology can be implemented in a form of a software product. The computer software product can be stored in a storage medium, such as a ROM/RAM, a magnetic disk, or an optical disc, and includes several instructions for instructing a computer device (can be a personal computer, a server, or a network device) to perform the methods described in the implementations or in some parts of the implementations of the present application.

The implementations in the present specification are described in a progressive way. For same or similar parts of the implementations, references can be made to the implementations. Each implementation focuses on a difference from other implementations. Particularly, a device implementation is similar to a method implementation, and therefore is described briefly. For a related part, references can be made to some descriptions in the method implementation. The previously described device implementations are merely examples. The modules described as separate parts can be physically separate or not. During implementation of the present application, functions of the modules can be implemented in one or more pieces of software and/or hardware. Some or all of the modules can be selected based on an actual need to implement the solutions of the implementations. A person of ordinary skill in the art can understand and implement the implementations of the present application without creative efforts.

The previous descriptions are merely specific implementations of the present application. It is worthwhile to note that a person of ordinary skill in the art can make several improvements or polishing without departing from the principle of the present application. The improvements and polishing shall fall within the protection scope of the present application.

Figure 7:
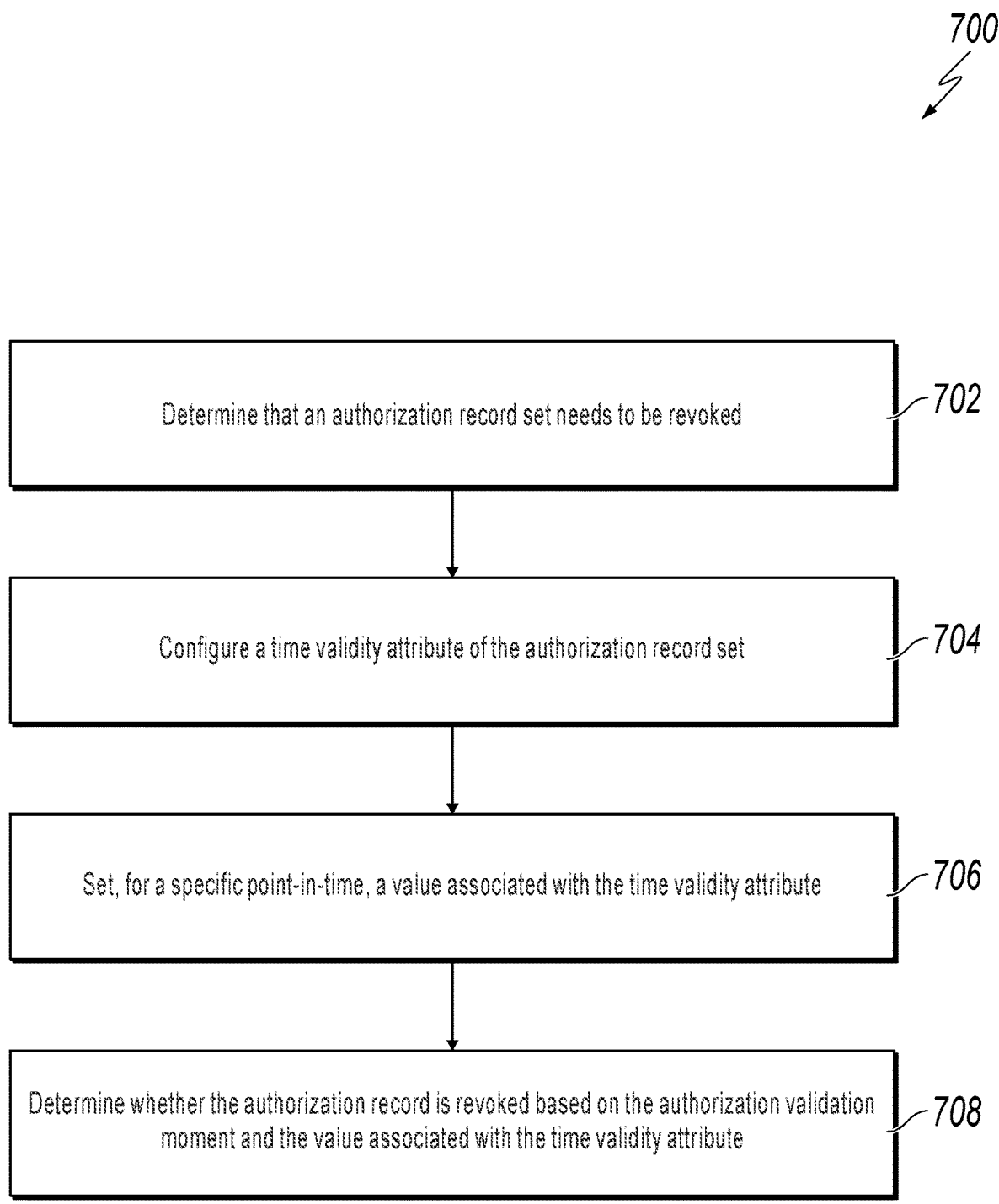
FIG. 7 is a flowchart illustrating an example of a computer-implemented method for batch-revoking authorization records associated with an authorized party, according to an implementation of the present application.

FIG. 7 is a flowchart illustrating an example of a computer-implemented method 700 for batch-revoking authorization records associated with an authorized party, according to an implementation of the present application. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, an authorizing party determines an authorization record set that needs to be revoked, where an authorization record included in the authorization record set corresponds to a token that is issued to an authorized party after the authorizing party grants access to the authorized party, and where each authorization record includes an authorization validation moment for a corresponding token. From 702, method 700 proceeds to 704.

At 704, a time validity attribute of the authorization record set is configured. From 704, method 700 proceeds to 706.

At 706, for a specific point-in-time, a value associated with the time validity attribute is set. In some implementations, all of the authorization records in the authorization record set are revoked by setting the value of the time validity attribute to a current moment. In some implementations, the value of the time validity attribute is set to a range between a latest validation moment and a next earliest authorization validation moment associated with the authorization records in authorization record set that needs to be revoked.

At 708, a determination is performed as to whether the authorization record is revoked based on the authorization validation moment and the value associated with the time validity attribute. In some implementations, prior to determining whether the authorization record is revoked based on its authorization validation moment and the value associated with the time validity attribute, a determination is performed as to whether a validity attribute value associated with the authorization record is valid. In some implementations, an authorization record is revoked if the authorization validation moment is earlier than the value of the time validity attribute. In some implementations, the authorization record set is configured with another time validity attribute and the time validity attribute is set to a first value and the other time validity attribute is set to a second value. The authorization record is revoked if an authorization validation time is earlier than the first value or if the authorization validation time is later than the second value. In some implementations, method 700 further includes determining, a next earliest authorization validation moment and setting the value of the time validity attribute to a future moment, where the future moment is earlier than the next earliest authorization validation moment. After 708, method 700 can stop.

Implementations of the present application can solve technical problems in revoking tokens issued to an authority party. Traditionally, the authorizing party controls whether authority is valid by using an attribute field (such as, "validity") in each authority record. To revoke tokens issued to the authority party, the authorizing party needs to write each piece of authority granted to the authorized party as a record to a database, add an attribute field used to indicate whether the authority is valid to each record, and actively revoke the authority by modifying a value of the field (such as, to "invalid"). An issue with this solution is that each time the authorizing party revokes a piece of authority, a field update operation needs to be performed on the database. If authority needs to be revoked in batches, related authorization records need to be updated one-by-one, resulting in low processing efficiency. In addition, operation logic of "updating one-by-one" also needs to be compiled and implemented using high resource costs (for example, time, processing, and labor). If different authorization records are stored in different libraries or tables, corresponding data update operations need to be related to library separation or table separation, further increasing technology implementation difficulties. Described is a technique to bypass these issues of conventional methods, and to provide a more efficient solution so that the authorizing party can efficiently revoke granted authorities in batches.

Implementation of the present application provide methods and apparatuses for improving the efficiency of revoking granted authorities by configuring a time validity attribute to a set that includes the authorization record that needs to be revoked, and setting a value of the time validity attribute to specific time point. So that if a validation moment of a single record is earlier than a time validity attribute value of the set, the authorization record is determined to be invalid; otherwise, if a validation moment of a single record is later than or equal to a time validity attribute value of the set, the authorization record is determined to be valid.

In actual practice, a large number of authorization records can be created and later need to be revoked by an authorizing party. When authority needs to be revoked in batches, assume that n authority records need to be revoked, attribute field "validity" corresponding to the authority records need to be modified one-by-one. Theoretical algorithm complexity in completing all revoking processing is $O(n)$. Actual processing difficulty is further improved if the n records are stored in different libraries or tables. Comparison with the existing technology, the described solution can reduce theoretical algorithm complexity from $O(n)$ to $O(1)$. In addition, because authority batch-revoking can be implemented by performing a one-time data modification on the database, a plurality of complex cases in which authority records are stored in separate libraries or separate tables do not need to be considered, effectively reducing actual technology implementation difficulties.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by an authorizing party and from an application, a plurality of first access requests to a service provided by the authorizing party, wherein the plurality of first access requests correspond to a plurality of users;
   determining, by the authorizing party, that the plurality of first access requests are granted;
   issuing, by the authorizing party and to the application, a plurality of tokens;
   storing, by the authorizing party, a plurality of authorization records that correspond to the plurality of tokens, wherein each authorization record includes a validation date of the authorization record;
determining, by the authorizing party, an authorization record set that needs to be revoked, wherein the authorization record set comprises the plurality of authorization records;
modifying a time validity attribute value of the authorization record set to revoke authorization records in the authorization record set in batches, comprising:
determining a latest authorization validation date associated with the authorization records in the authorization record set that needs to be revoked;
determining a next earliest authorization validation date associated with the authorization records in the authorization record set that needs to be revoked; and
setting the time validity attribute value to a future date, wherein the future date is set to a range between the latest authorization validation date and the next earliest authorization validation date;
receiving a second access request from the application for accessing the service provided by the authorizing party, wherein the second access request corresponds to a particular user among the plurality of users;
determining, by the authorizing party, a particular authorization record to be verified that corresponds to the particular user;
obtaining, the validation date of the authorization record to be verified;
obtaining, the time validity attribute value of the authorization record set that includes the particular authorization record to be verified;
determining that the particular authorization record to be verified is revoked if the validation date of the authorization record is earlier than the time validity attribute value of the authorization record set; and
in response, rejecting the second access request from the application for accessing the service.

2. The computer-implemented method of claim 1, wherein modifying the time validity attribute value of the authorization record set further comprises setting the time validity attribute value to a current moment.

3. The computer-implemented method of claim 1, wherein the authorization record set is configured with another time validity attribute value, and wherein the time validity attribute value is set to a first value and the other time validity attribute value is set to a second value, and the authorization record is revoked:
whenever the validation date is earlier than the first value; or
whenever the validation date is later than the second value.

4. A non-transitory, computer-readable medium storing one or more instructions executable by a computer system to perform operations comprising:
receiving, by an authorizing party and from an application, a plurality of first access requests to a service provided by the authorizing party, wherein the plurality of first access requests correspond to a plurality of users;
determining, by the authorizing party, that the plurality of first access requests are granted;
issuing, by the authorizing party and to the application, a plurality of tokens;
storing, by the authorizing party, a plurality of authorization records that correspond to the plurality of tokens, wherein each authorization record includes a validation date of the authorization record;
determining, by the authorizing party, an authorization record set that needs to be revoked, wherein the authorization record set comprises the plurality of authorization records;
modifying a time validity attribute value of the authorization record set to revoke authorization records in the authorization record set in batches, comprising:
determining a latest authorization validation date associated with the authorization records in the authorization record set that needs to be revoked;
determining a next earliest authorization validation date associated with the authorization records in the authorization record set that needs to be revoked; and
setting the time validity attribute value to a future date, wherein the future date is set to a range between the latest authorization validation date and the next earliest authorization validation date;
receiving a second access request from the application for accessing the service provided by the authorizing party, wherein the second access request corresponds to a particular user among the plurality of users;
determining, by the authorizing party, a particular authorization record to be verified that corresponds to the particular user;
obtaining, the validation date of the authorization record to be verified;
obtaining, the time validity attribute value of the authorization record set that includes the particular authorization record to be verified;
determining that the particular authorization record to be verified is revoked if the validation date of the authorization record is earlier than the time validity attribute value of the authorization record set; and
in response, rejecting the second access request from the application for accessing the service.

5. The non-transitory, computer-readable medium of claim 4, wherein modifying the time validity attribute value of the authorization record set further comprises setting the time validity attribute value to a current moment.

6. The non-transitory, computer-readable medium of claim 4, wherein the authorization record set is configured with another time validity attribute value, and wherein the time validity attribute value is set to a first value and the other time validity attribute value is set to a second value, and the authorization record is revoked:
whenever the validation date is earlier than the first value; or
whenever the validation date is later than the second value.

7. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by an authorizing party and from an application, a plurality of first access requests to a service provided by the authorizing party, wherein the plurality of first access requests correspond to a plurality of users;
determining, by the authorizing party, that the plurality of first access requests are granted;
issuing, by the authorizing party and to the application, a plurality of tokens;

storing, by the authorizing party, a plurality of authorization records that correspond to the plurality of tokens, wherein each authorization record includes a validation date of the authorization record;

determining, by the authorizing party, an authorization record set that needs to be revoked, wherein the authorization record set comprises the plurality of authorization records;

modifying a time validity attribute value of the authorization record set to revoke authorization records in the authorization record set in batches, comprising:
  determining a latest authorization validation date associated with the authorization records in the authorization record set that needs to be revoked;
  determining a next earliest authorization validation date associated with the authorization records in the authorization record set that needs to be revoked; and
  setting the time validity attribute value to a future date, wherein the future date is set to a range between the latest authorization validation date and the next earliest authorization validation date;

receiving a second access request from the application for accessing the service provided by the authorizing party, wherein the second access request corresponds to a particular user among the plurality of users;

determining, by the authorizing party, a particular authorization record to be verified that corresponds to the particular user;

obtaining, the validation date of the authorization record to be verified;

obtaining, the time validity attribute value of the authorization record set that includes the particular authorization record to be verified;

determining that the particular authorization record to be verified is revoked if the validation date of the authorization record is earlier than the time validity attribute value of the authorization record set; and in response, rejecting the second access request from the application for accessing the service.

8. The computer-implemented system of claim 7, wherein modifying the time validity attribute value of the authorization record set further comprises setting the time validity attribute value to a current moment.

9. The computer-implemented system of claim 7, wherein the authorization record set is configured with another time validity attribute value, and wherein the time validity attribute value is set to a first value and the other time validity attribute value is set to a second value, and the authorization record is revoked:

whenever the validation date is earlier than the first value; or whenever the validation date is later than the second value.

* * * * *